(12) United States Patent
Liu (10) Patent No.: US 9,993,024 B2
(45) Date of Patent: Jun. 12, 2018

(54) BATTERY ROD AND ELECTRONIC CIGARETTE

(71) Applicant: HUIZHOU KIMREE TECHNOLOGY CO., LTD., Shenzhen (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 0 days. days.

(21) Appl. No.: 15/113,461

(22) PCT Filed: Jan. 22, 2014

(86) PCT No.: PCT/CN2014/071100
§ 371 (c)(1),
(2) Date: Jul. 22, 2016

(87) PCT Pub. No.: WO2015/109454
PCT Pub. Date: Jul. 30, 2015

(65) Prior Publication Data
US 2017/0006920 A1    Jan. 12, 2017

(51) Int. Cl.
*A24F 47/00* (2006.01)
*H01M 2/08* (2006.01)
(Continued)

(52) U.S. Cl.
CPC ............ *A24F 47/008* (2013.01); *H01M 2/08* (2013.01); *H01M 2/1055* (2013.01);
(Continued)

(58) Field of Classification Search
CPC ...... A24F 47/008; A24F 47/00; A24F 47/002; A24F 47/004
(Continued)

(56) References Cited

U.S. PATENT DOCUMENTS 8,499,766 B1 * 8/2013 Newton ................ A24F 47/008
                                                              131/273
8,863,753 B2 * 10/2014 Li ........................... A24F 47/008
                                                              131/270
(Continued)

FOREIGN PATENT DOCUMENTS

CN       203353687 U     12/2013
CN       203353689 U     12/2013
RU       121706 U1       11/2012

OTHER PUBLICATIONS

International Search Report of PCT Patent Application No. PCT/CN2014/071100 dated Oct. 27, 2014.

*Primary Examiner* — Abdullah Riyami
*Assistant Examiner* — Vladimir Imas (57) ABSTRACT

The invention relates to a battery rod and an electronic cigarette. The battery rod comprises a battery casing, a battery, a control module, and an end cover. Wires and an airflow sensor are provided on the control module. An elastic mounting base is provided within the battery casing. The elastic mounting base is provided with a through hole running along the axial direction. The control module is installed in the through hole of the elastic mounting base. An inner peripheral surface of the elastic mounting base elastically abuts against an outer peripheral surface of the control module. The wires penetrate the through hole and parts of the wires are compressed between the control module and the elastic mounting base. Compared to the prior art wherein wires pass through separate holes, the invention has a simple assembly means, reduces the product defect rate, and improves the sensitivity of the electronic cigarette.

17 Claims, 7 Drawing Sheets (51) Int. Cl.
　　　*H05B 1/02*　　　(2006.01)
　　　*H01M 2/10*　　　(2006.01)

(52) U.S. Cl.
　　　CPC ....... *H05B 1/0244* (2013.01); *H01M 2220/30* (2013.01); *H05B 2203/021* (2013.01)

(58) Field of Classification Search
　　　USPC .................................................. 131/329, 273
　　　See application file for complete search history.

(56) References Cited

U.S. PATENT DOCUMENTS

| | | | | |
|---|---|---|---|---|
| 9,155,336 B2 * | 10/2015 | Liu | ........................ | A24F 47/002 |
| 9,271,527 B2 * | 3/2016 | Liu | ........................ | A24F 47/002 |
| 9,271,528 B2 * | 3/2016 | Liu | ........................ | A24F 47/008 |
| 9,301,548 B2 * | 4/2016 | Liu | ........................ | A24F 47/002 |
| 9,301,549 B2 * | 4/2016 | Liu | ........................ | A24F 47/008 |
| 9,332,787 B2 * | 5/2016 | Liu | ........................ | A24F 47/008 |
| 9,364,024 B2 * | 6/2016 | Liu | ........................ | A24F 47/008 |
| 9,364,025 B2 * | 6/2016 | Liu | ........................ | A24F 47/008 |
| 9,364,026 B2 * | 6/2016 | Liu | ........................ | A24F 47/008 |
| 9,386,805 B2 * | 7/2016 | Liu | ........................ | A24F 47/008 |
| 9,402,421 B2 * | 8/2016 | Liu | ........................ | A24F 47/008 |
| 9,414,628 B2 * | 8/2016 | Liu | ........................ | A24F 47/008 |
| 9,427,023 B2 * | 8/2016 | Liu | ........................ | A24F 47/002 |
| 9,480,286 B2 * | 11/2016 | Liu | ........................ | A24F 47/008 |
| 9,497,994 B2 * | 11/2016 | Liu | ........................ | A61M 15/06 |
| 9,497,996 B2 * | 11/2016 | Liu | ........................ | A24F 47/008 |
| 9,497,998 B2 * | 11/2016 | Chen | ........................ | A24F 47/008 |
| 9,538,789 B2 * | 1/2017 | Liu | ........................ | A24F 47/008 |
| 9,668,517 B2 * | 6/2017 | Liu | ........................ | A24F 47/008 |
| 9,717,275 B2 * | 8/2017 | Liu | ........................ | A24F 47/008 |
| 9,723,872 B2 * | 8/2017 | Liu | ........................ | A24F 47/008 |
| 9,745,567 B2 * | 8/2017 | Watson | ................... | C12N 13/00 |
| 2011/0304282 A1 * | 12/2011 | Li | ........................ | A24F 47/008 315/362 |
| 2013/0192615 A1 * | 8/2013 | Tucker | ................... | H01C 17/00 131/328 |

\* cited by examiner

BATTERY ROD AND ELECTRONIC CIGARETTE

TECHNICAL FIELD

The present application relates to the technical field of a cigarette substitute, and more particularly, relates to a battery rod and an electronic cigarette.

BACKGROUND

Figure 1:
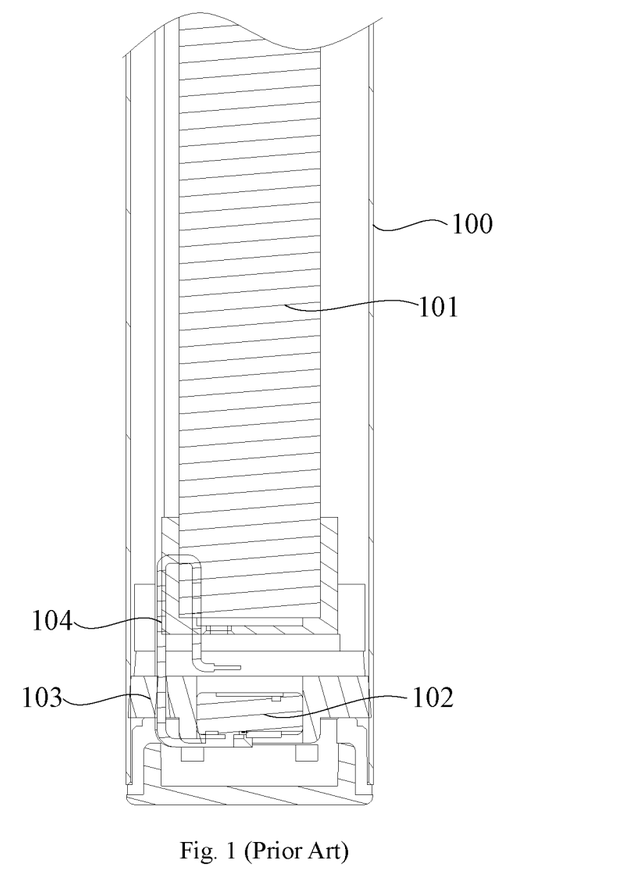
FIG. 1 is a cutaway view of a battery rod provided by the prior art.

As shown in FIG. 1, an electronic cigarette of the prior art a battery rod comprises a battery casing 100, a battery 101 which is accommodated in the battery casing 100, a control module 102 which is used for controlling the battery 101 to charge an atomizing assembly, and an mounting base 103 which is utilized to fix the control module 102 and is made of hard plastic material. The control module 102 is defined with wires 104 which are connected to the battery 101 and the atomizing assembly, an airflow sensor which is used for responding to a smoking action. The mounting base 103 which is hard is specially provided with a through hole which is utilized to allow the wires 104 to pass through, when assembling the battery rod, the control module 102 and the wires 104 thread from different holes respectively, it is easy to cause a sealing without tightness between the wires 104 and the mounting base 103, and between the control module 102 and the mounting base 103, leading to a gas leakage phenomenon, thus, when smoking intensity is light, the airflow sensor is not easy to detect a smoking airflow, and a sensitivity of the electronic cigarette is low, leading to a poor user experience; besides, the wires 104 are compressed in the mounting base 103 which is hard, the wires 104 are easy to be broken or fractured, resulting a phenomenon of short circuit or open circuit of a circuit.

BRIEF SUMMARY

The object of the present application is to provide a battery rod and an electronic cigarette which enables a well sealing, a high sensitivity, and ensures the wires are not easy to be broken or fractured, aiming at the drawbacks in the prior art that the wires and the control module pass through different holes of the mounting base which is hard easily leads to broken or fractured wires and a defect on a low sensitivity of the electronic cigarette.

Technical proposals which are adopted by the present invention to solve technical problems are as follows. In accordance with one aspect of the present application, a battery rod is provided, which comprises a battery casing, a battery which is accommodated within the battery casing, a control module which is utilized for controlling the battery to supply power to the atomizing assembly, and an end cover that covers one end of the battery casing, wires which is used for an electrical connection and an airflow sensor which is used for sensing a smoking action are provided on the control module, wherein, an elastic mounting base is also provided within the battery casing, the elastic mounting base is provided with a through hole running along an axial direction of the elastic mounting base, the control module is installed in the through hole of the elastic mounting base, an inner peripheral surface of the elastic mounting base elastically abuts against an outer peripheral surface of the control module, the wires thread through the through hole and parts of the wires are pressed between the control module and the elastic mounting base.

Advantageously, in the battery rod of the present application, along a periphery of the through hole, one end of the elastic mounting base which is on an opposite side of the end cover is convexly defined with an oil proof ring which is utilized for prevent cigarette oil from entering into the through hole.

Advantageously, in the battery rod of the present application, a wall of the through hole outwardly recesses along a radial direction and forms a fixing slot which is utilized to fix the control module, at least one end of the elastic mounting base which is close to the fixing slot is defined with a blocking portion which is utilized for prevent the control module from falling off.

Advantageously, in the battery rod of the present application, the end cover comprises a cover body which is defined outside the battery casing and a connecting sleeve which is interposed at the battery casing, the connecting sleeve is embedded with a diffusion cover which is utilized to enable light source to evenly disperse, one end of the diffusion cover which is close to the elastic mounting base is provided with at least one first groove which is used to allow a communication of an airflow and connect with the through hole.

Advantageously, in the battery rod of the present application, the diffusion cover is a hollow cylinder and comprises a circular ring which is embedded in the connecting sleeve and a circular convex platform that protrudes from one end surface of the circular ring which is close to the elastic mounting base, the first groove is a through groove which is defined on an axial direction of the circular convex platform.

Advantageously, in the battery rod of the present application, the elastic mounting base comprises a body portion and an abutting portion that diameter-decreasingly protrudes in an axial direction along one side of the body portion which is close to the diffusion cover, one end surface of the body portion is abutted and fixed with one end surface of the connecting sleeve, one end surface of the abutting portion is abutted and fixed with one end surface of the circular convex platform, the through hole axially penetrates a middle part of the abutting portion and the body portion.

Advantageously, in the battery rod of the present application, further comprises a fixing support which is defined on one side of the elastic mounting base which is opposite to the end cover and is abutted against the elastic mounting base, one end of the battery is fixed in the fixing support, the wires comprise a first wire, a second wire and a third wire, the first wire is connected to one end of the battery after threading from the through hole, the second wire and the third wire are compressed to fix between the battery and the fixing support after threading from the through hole.

Advantageously, in the battery rod of the present application, a side wall of the cover body defines an air inlet hole which is communicated with inside of the battery casing; along an axial direction of the connecting sleeve, an outer surface of the connecting sleeve is provided with an air inlet groove which is communicated with the air inlet hole, one end of the air inlet groove which is opposite to the air inlet hole is connected with a hollow inside of the connecting sleeve.

Advantageously, in the battery rod of the present application, at least one second groove is defined on one end surface of the body portion which is close to the fixing support, at least one notch is defined on an outer surface of the fixing support along an axial direction of the fixing support, the air inlet hole, the air inlet groove, the first groove, the through hole, the second groove and the notch are communicated to form an air passage inside the battery casing.

Advantageously, in the battery rod of the present application, the fixing support is a step cylinder, and comprises a first cylindrical portion and a second cylindrical portion which is sleeved on the first cylindrical portion, the notch is defined on an outer surface of the first cylindrical portion, quantity of the notch is two and two notches are defined symmetrically to the central axis of the fixing support; one end of the battery is fixed inside the second cylindrical portion.

Advantageously, in the battery rod of the present application, further comprises a first electrode connecting piece and a second electrode connecting piece which are defined on one end of the battery casing which is opposite to the end cover and insulated from each other, the second wire threads through the through hole and is pressed between the battery and the fixing support, then extends along one side which is close to the first electrode connecting piece and is electrically connected to the first electrode connecting piece, the third wire threads through the through hole and is pressed between the battery and the fixing support, then extends along one side which is close to the second electrode connecting piece and is electrically connected to the second electrode connecting piece.

Advantageously, in the battery rod of the present application, one side of the second wire which is close to the first electrode connecting piece is provided with a bending portion, the bending portion is electrically connected to the other end of the battery.

Advantageously, in the battery rod of the present application, the elastic mounting base can be a silicone product, a polyurethane product, a polyvinyl chloride product or an ethylene vinyl acetate copolymer product.

Advantageously, in the battery rod of the present application, the diffusion cover is made of silica gel.

In accordance with other aspect of the present application, an electronic cigarette is further provided, which comprises an atomizing assembly and a battery rod which are connected with each other, the battery rod comprises a battery casing, a battery which is accommodated within the battery casing, a control module which is utilized for controlling the battery to supply power to the atomizing assembly, and an end cover that covers one end of the battery casing, wires which is used for an electrical connection and an airflow sensor which is used for sensing a smoking action are provided on the control module, wherein, an elastic mounting base is also provided within the battery casing, the elastic mounting base is provided with a through hole running along an axial direction of the elastic mounting base, the control module is installed in the through hole of the elastic mounting base, an inner peripheral surface of the elastic mounting base elastically abuts against an outer peripheral surface of the control module, the wires thread through the through hole and parts of the wires are pressed between the control module and the elastic mounting base.

Advantageously, in the electronic cigarette of the present application, along a periphery of the through hole, one end of the elastic mounting base which is on an opposite side of the end cover is convexly defined with an oil proof ring which is utilized for prevent cigarette oil from entering into the through hole.

Advantageously, in the electronic cigarette of the present application, a wall of the through hole outwardly recesses along a radial direction and forms a fixing slot which is utilized to fix the control module, at least one end of the elastic mounting base which is close to the fixing slot is defined with a blocking portion which is utilized for prevent the control module from falling off.

Advantageously, in the electronic cigarette of the present application, the end cover comprises a cover body which is defined outside the battery casing and a connecting sleeve which is interposed at the battery casing, the connecting sleeve is embedded with a diffusion cover which is utilized to enable light source to uniformly disperse, one end of the diffusion cover which is close to the elastic mounting base is provided with at least one first groove which is used to allow a communication with an airflow and a connection with the through hole.

Advantageously, in the electronic cigarette of the present application, further comprises a fixing support which is defined on one side of the elastic mounting base which is opposite to the end cover and is abutted against the elastic mounting base, one end of the battery is fixed in the fixing support, the wires comprise a first wire, a second wire and a third wire, the first wire is connected to one end of the battery after threading from the through hole, the second wire and the third wire are pressed to fix between the battery and the fixing support after threading from the through hole.

With application of the battery rod and the electronic cigarette, the following advantages can be achieved: by embedding the control module inside an elastic mounting base, and defining the through hole that penetrates the elastic mounting base along its axial direction, and then fixing the control module and the wires into the through hole, it is possible for an inner peripheral surface of the elastic mounting base to abut against an outer wall of the control module, the wires are arranged and partly compressed between the control module and the elastic mounting base, thus, the control module and the wires pass through the same though hole, compared to the prior art wherein wires pass through separate holes, the present invention has a simple assembly means, saves time, and reduces a product defect rate, one through hole is only needed to be defined on the elastic mounting base, it is easy for producing a mould of the elastic mounting base, and extending a service life; as an elastic behavior of the elastic mounting base, the phenomenon of short circuit and open circuit which are caused by a break or a fracture of the wires can be avoided; the elastic mounting base compresses both the control module and the wires to improve the tightness of the sealing between the control module and the elastic mounting base and seal two sides of the elastic mounting base, when users smoke lightly, a differential air pressure is formed at the two sides of the elastic mounting base, making a smoking signal is detected by the airflow sensor, thus to improve the sensitivity of the electronic cigarette.

BRIEF DESCRIPTION OF THE DRAWINGS

The present application will be further described with reference to the accompanying drawings and embodiments in the following. Obviously, the following accompanying drawings are only parts of the present application and it is possible for one skilled in the art to obtain other accompanying drawings according to these.

DETAILED DESCRIPTION OF THE PREFERRED EMBODIMENT

The example embodiments of the present application will be further described with referencing to the accompanying drawings, to have a clear understanding of the technical features, purposes and effects of the present invention. Obviously, the following example embodiments are only parts of the embodiments of the present application.

Figure 2:
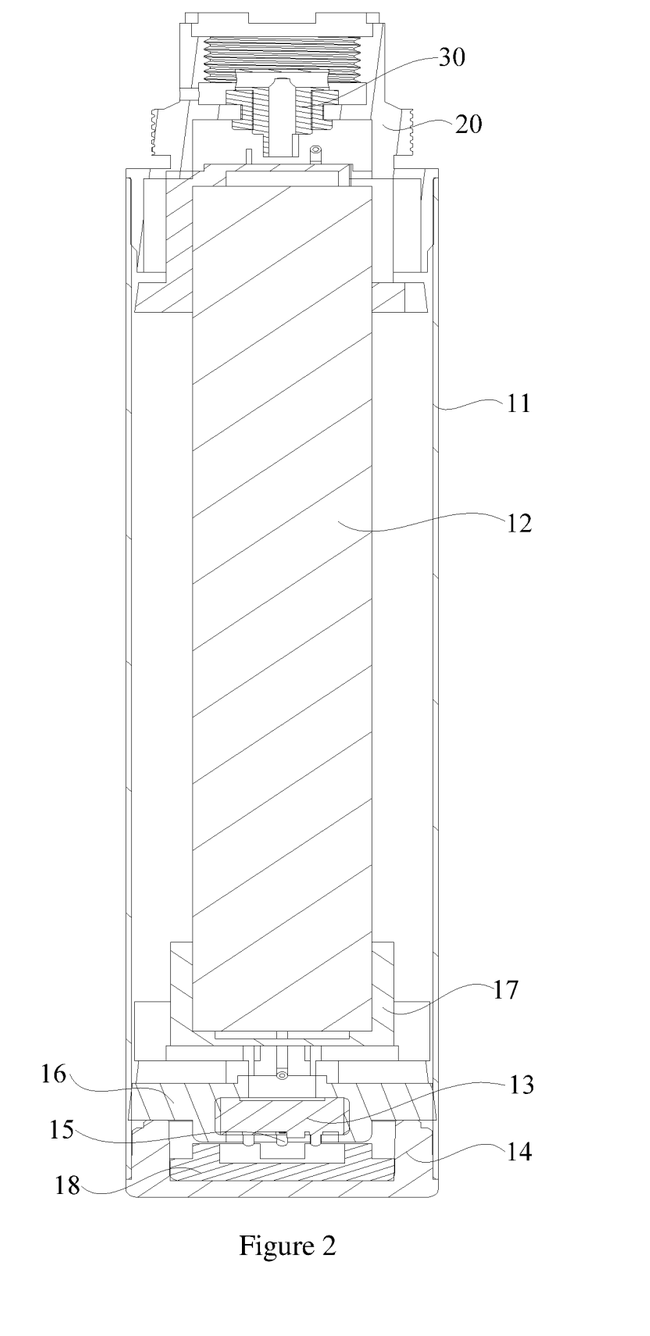
FIG. 2 is a first cutaway view of a battery rod provided by a preferred embodiment of the present application.
Figure 3:
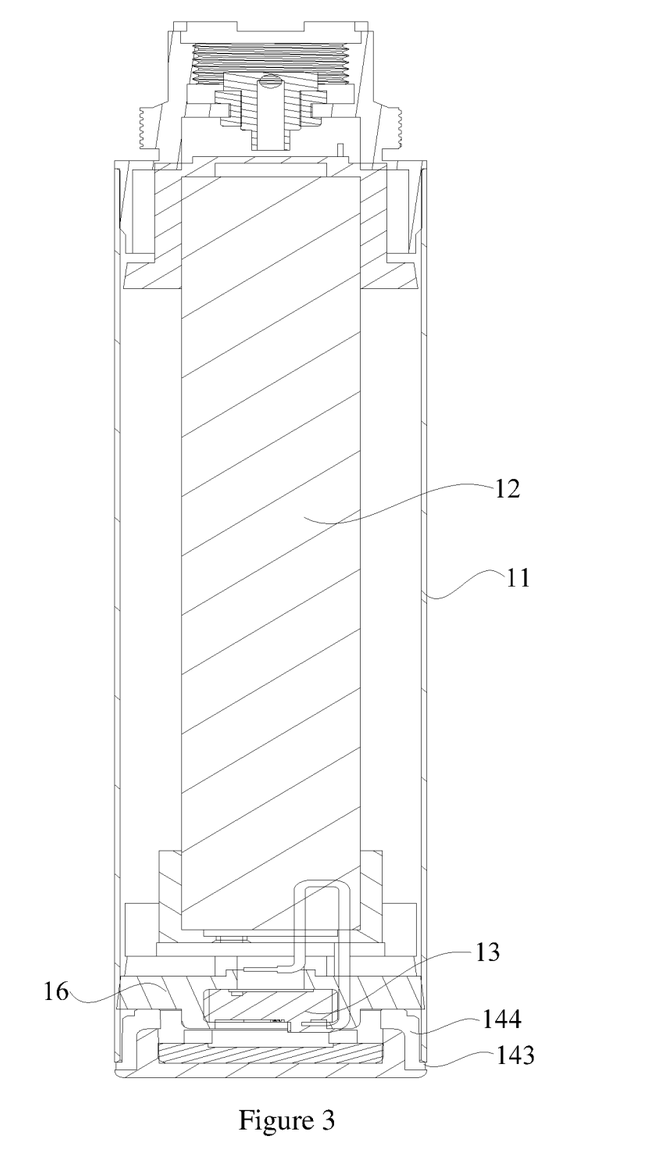
FIG. 3 is a second cutaway view of a battery rod provided by a preferred embodiment of the present application.
Figure 4:
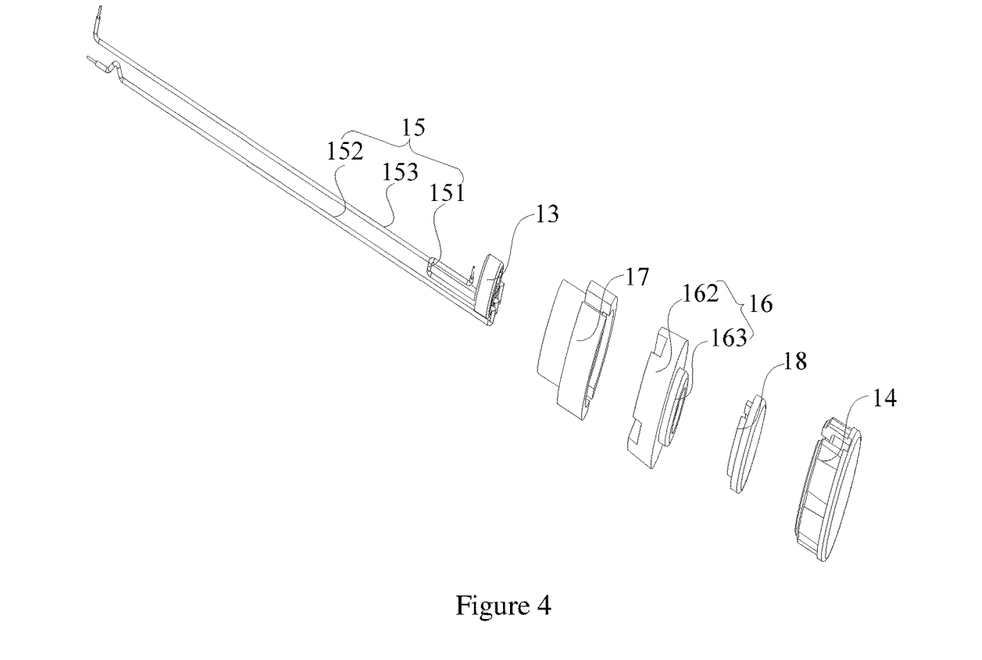
FIG. 4 is an exploded diagram of parts of a battery rod in FIG. 2 and FIG. 3.

Refer to FIG. 2, FIG. 3 and FIG. 4, a battery rod 1 provided by a preferred embodiment of the present application which is utilized for forming an electronic cigarette in a combination with an atomizing assembly, the battery rod 1 comprises a battery casing 11, a battery 12, a control module 13, an end cover 14, wires 15, an elastic mounting base 16, a fixing support 17, a diffusion cover 18, a first electrode connecting piece 20 and a second electrode connecting piece 30.

The battery casing 11 is roughly a hollow cylinder, the end cover 14 covers one end of the battery casing 11, the first electrode connecting piece 20 and the second electrode connecting piece 30 are defined on one end of the battery casing 11 which is opposite to the end cover 14, the first electrode connecting piece 20 and the second electrode connecting piece 30 are both made of conductive materials and have conductive functions, the first electrode connecting piece 20 and the second electrode connecting piece 30 are insulated from each other. The battery 12, the control module 13, the wires 15, the elastic mounting base 16, the fixing support 17 and the diffusion cover 18 are all accommodated in the battery casing 11. The end cover 14 defines an air inlet hole 143 which is utilized to allow an outside airflow to flow into, and an air inlet groove 144 which is communicated with the air inlet hole 143; the wires 15 are defined on the control module 13 and are electrically connected to the control module 13, the wires 15 comprise a first wire 151, a second wire 152 and a third wire 153; the elastic mounting base 16 is abutted against the end cover 14, specifically, the elastic mounting base 16 comprises a body portion 162 which is abutted against on end of the end cover 14, and an abutting portion 163 which is abutted against the diffusion cover 18.

Figure 5:
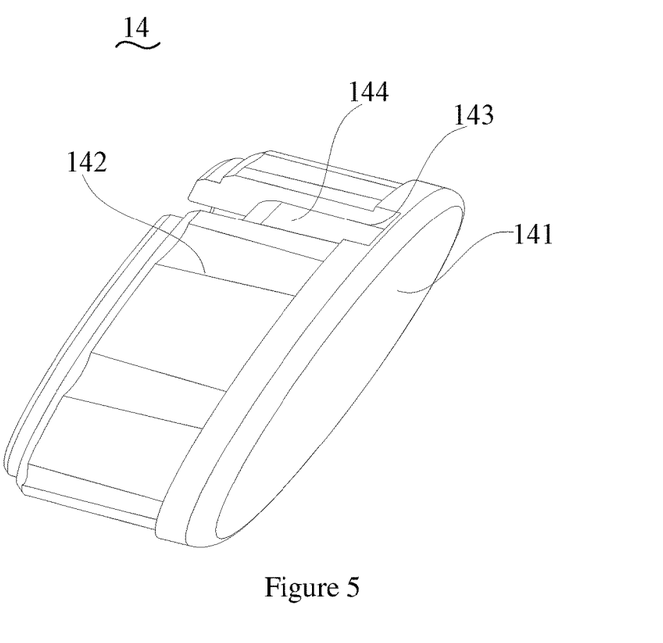
FIG. 5 is a structure diagram of an end cover provided by a preferred embodiment of the present application.

Refer to FIG. 5, the end cover 14 comprises a cover body 141 and a connecting sleeve 142, the cover body 141 is defined outside the battery casing 11, the connecting sleeve 142 is interposed at the battery casing 11, which means that, the cover body 131 covers on one end of the battery casing 11 to prevent the end cover 14 from sinking into the battery casing 11. A side wall of the cover body 141 defines an air inlet hole 143 which is communicated with inside of the battery casing 11, the air inlet hole 143 is utilized to allow an outside airflow flows into the battery rod; an outer surface of the connecting sleeve 142 is provided with an air inlet groove 144, the air inlet groove 144 extends to the connecting sleeve 142 along a side wall of the air inlet hole 143, one end of the air inlet groove 144 which is opposite to the air inlet hole 143 is connected with a hollow inside of the connecting sleeve 142. Understandably, quantify of the air inlet hole 143 and the air inlet hole 144 are not limited to one, they can be several to ensure airflow to flow smooth in the battery rod.

Figure 6:
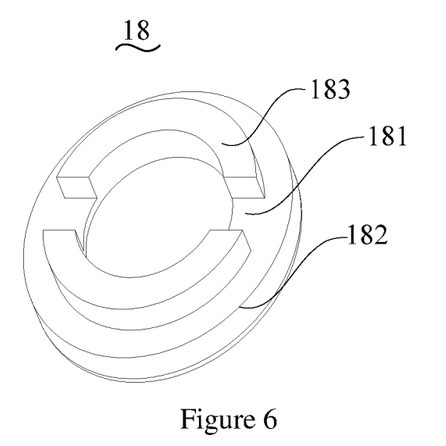
FIG. 6 is a structure diagram of a diffusion cover provided by a preferred embodiment of the present application.

Refer to FIG. 6, the diffusion cover 18 is a hollow cylinder, and is embedded into the connecting sleeve 142, an outer peripheral surface of the diffusion cover 18 is abutted and fixed with an inner sidewall of the connecting sleeve 142. The diffusion cover 18 is made of silica gel, an outer surface of the diffusion cover 18 is provided with rough and uneven surface lines, because of the rough and uneven surface lines, when light passes through the diffusion cover 18, refraction and reflection on the diffusion cover 18 are different on different point, so that the light source is spread uniformly. Specifically, a lightening portion (bot labeled in figures) is defined on the control module 13, the end cover 14 is a transparent or semitransparent product, in the prior art, as the control module 13 is close to the end cover 14, a middle part is brighten, an edge area is dark, a phenomenon of uneven distribution of light occurs; by providing the diffusion cover 18 inside the end cover 14 in the present invention to uniformly spread the light emitted from the lightening portion, and avoid the phenomenon of an over concentrated light and uneven distribution of light. In other embodiments, the diffusion cover 18 can be a concave lens.

In the present invention, the diffusion cover 18 comprises a circular ring 182 which is embedded in the connecting sleeve 142 and a circular convex platform 183 that protrudes from one end surface of the circular ring 182 which is close to the elastic mounting base 16, the circular ring 182 and the circular convex platform 183 are defined by the same axis and equal inner diameters, but an outer diameter of the circular convex platform 183 is smaller than that of the circular ring 182, which means that the circular convex platform 183 is form by decreasing a diameter of one end surface of the circular ring 182 which is close to the elastic mounting base 16. The circular convex platform 183 is equipped with at least one first groove 181 which is used to allow a communication of an airflow, the first groove 181 is connected with the air inlet groove 144 in the end cover 14 to allow an outside airflow to further flow inside the diffusion cover 18 from the end cover 14. Specifically, the first groove 181 is a through groove which is defined on an axial direction of the circular convex platform 183, which means that, the first groove 181 is a through groove which is formed by downward concaving along an axial direction of the circular convex platform 183, making an outside airflow to further flow inside the diffusion cover 18 from the end cover 14. In the present invention, two first grooves 181 are defined symmetrically to a central axis of the diffusion cover 18, and divides the circular convex platform 183 into two semicircles. Understandably, quantity of the first groove 181 can be several, and is not limited here.

Figure 7:
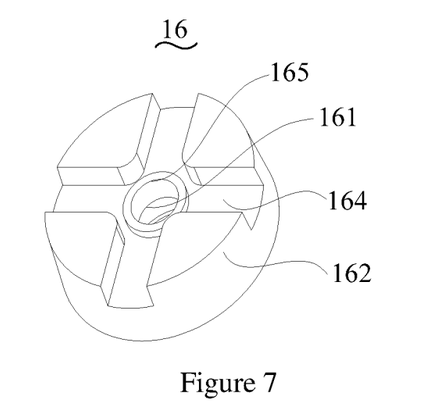
FIG. 7 is a structure diagram of an elastic mounting base provided by a preferred embodiment of the present application.

As shown in FIG. 4 and FIG. 7, the elastic mounting base 16 is a cylinder and sleeved inside the battery casing 11, and abuts against the end cover 14, the elastic mounting base 16 is provided with a through hole 161 running along an axial direction of the elastic mounting base 16, the control module 13 and the wires 15 are installed in the through hole 161 and elastically abut against an inner peripheral surface of the elastic mounting base 16, as an elastic behavior of the elastic mounting base 16, when the wires are compressed between the elastic mounting base 16 and the control module 13, a break or a fracture can be avoided. The elastic mounting base 16 is made of elastic materials, for instance, the elastic mounting base 16 can be a silicone product, a polyurethane product, a polyvinyl chloride product or an ethylene vinyl acetate copolymer product, the elastic mounting base 16 can be other elastic material products.

Figure 8:
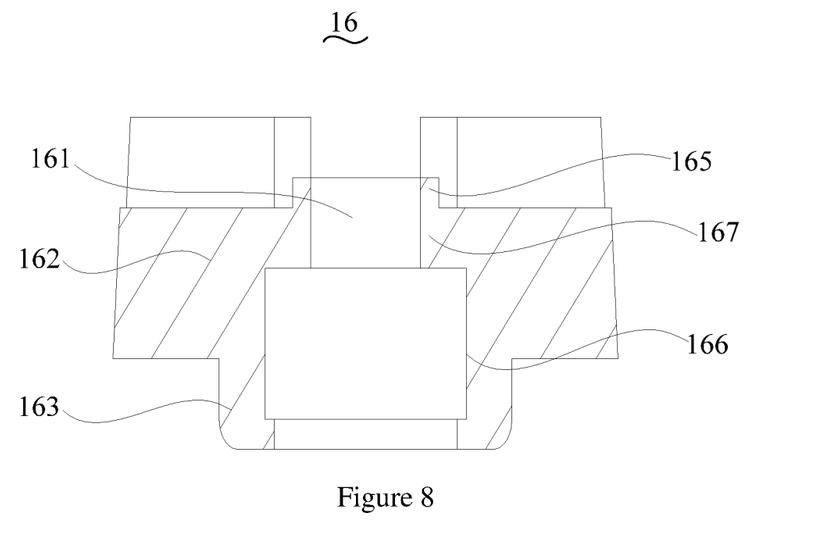
FIG. 8 is cutaway view of an elastic mounting base provided by a preferred embodiment of the present application.

Refer to FIG. 8, along a periphery of the through hole 161, one end of the elastic mounting base 16 which is on an opposite side of the end cover 14 is convexly defined with an oil proof ring 165 which is utilized for prevent cigarette oil from entering into the through hole 161, thus to prevent the control module 13 from damaging by cigarette oil and improve a service life of the control module 13. Further, to prevent the control module 13 from falling off, a wall of the through hole 161 outwardly recesses along a radial direction and forms a fixing slot 166 which is utilized to fix the control module 13, at least one end of the elastic mounting base 16 which is close to the fixing slot 166 is defined with a blocking portion 167. When the control module 12 is fixed in the through hole 161, a slot wall of the fixing slot 166 abuts against the outer surface of the control module 13 to fix the control module 13, when shaking the battery rod upward and downward, as a blocking behavior of the blocking portion 167, the phenomenon that the control module 13 falls off from the through hole 161 can be avoided. In one of the embodiments, the blocking portion 167 is defined between the fixing slot 166 and the oil proof ring 165 to stably fix the control module 13 and avoid falling off.

In the other embodiment, the elastic mounting base 16 comprises a body portion 162 and an abutting portion 163, the abutting portion 163 is formed diameter-decreasingly along one side of the body portion 162 which is close to the diffusion cover 18, which means that, he abutting portion 163 is formed by protruding along one side of the body portion 162 which is close to the diffusion cover 18, an outer diameters of the abutting portion 163 is smaller than that of the body portion 162, and the body portion 162 and the abutting portion 163 are defined axially. As shown in FIG. 3, in the present embodiment, the body portion 162 is a circular ring, the outer diameter of the body portion 162 is roughly equaled to that of the connecting sleeve 142, and one end surface of the body portion 162 is abutted and fixed with one end surface of the connecting sleeve 142; the outer diameter of the abutting portion 163 is roughly equaled to that of the circular convex platform 183 of the diffusion cover 18, making the abutting portion 163 is abuts and fixes with the circular convex platform 183, thus to ensure the diffusion cover 18 to fix between an inner surface of the cover body 141 and the abutting portion 163, to avoid the diffusion cover 18 shaking in the connecting sleeve 144. Therefore, during transporting or when shaking the battery rod, the connection of the diffusion cover 18 is stable, a structure strength is well. The through hole 161 axially penetrates a middle part of the abutting portion 163 and the body portion 162, which means that, the through hole 161 is formed by two parts, one part is defined on the abutting portion 163 while the other part is defined on the body portion 162, and the two parts mutually through each other to form the through hole 161 which is utilized to fix the control module 13 and the wires 15. In the present embodiment, the abutting portion 163 also can be a blocking portion 167 to prevent the control module 13 from falling off from the through hole 161, and the fixing slot 166 is defined on the body portion 162. Refer to FIG. 7, at least one second groove 164 is defined on one end surface of the body portion 162 which is opposite to the abutting portion 163, specifically, the second groove 164 is formed by a downward concave on one end surface of the body portion 162, and the second groove 164 is connected with the through hole 161 to allow an airflow to flow to the second groove 164 after entering from the through hole 161. In the present embodiment, quantity of the second groove 164 is four, the four second grooves 164 are corresponding defined mutually between each two, and each two corresponding second grooves 164 are connected with each other to form a square slot with a certain width. Preferably, the four second grooves 164 are equidistantly spaced and defined on one end surface of the body portion 162 which is opposite to the abutting portion 163, and are communicated with the through hole 161 to allow the airflow to flow inside the battery rod. The four second grooves 164 are enclosed to form a space, the oil proof ring 165 is convexly defined in the space along a periphery of the through hole 161, enabling the cigarette oil to be blocked in the second groove 164, so that a phenomenon of a damaged control module 13 which is caused by that the cigarette oil enters into the through hole 161 can be avoided. In the embodiments, quantity and shape of the second groove 164 are not limited, as well as the outer airflow can flow to the second groove 164 through the through hole 161.

Figure 10:
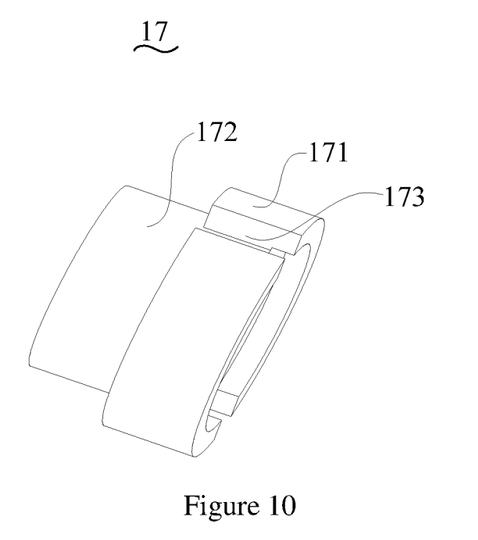
FIG. 10 is a structure diagram of a fixing support provided by a preferred embodiment of the present application.

Refer to FIG. 10, the fixing support 17 is a step cylinder, and is defined on one end of the elastic mounting base 16 which is opposite to the end cover 14 and abuts against and fix with the elastic mounting base 16, one end of the battery 12 is fixed inside the fixing support 17. At least one notch 173 is defined on an outer surface of the fixing support 17 along an axial direction of the fixing support 17, the notch 173 is connected with the second groove 163 in the elastic mounting base 16 to enable the airflow to flow through the notch 173 to one side of the atomizing assembly. In the present embodiment, the air inlet hole 143, the air inlet groove 144, the first groove 181, the through hole 151, the second groove 164 and the notch 173 are communicated to form an air passage inside the battery casing 11, when users inhale the electronic cigarette, the airflow that enters the battery rod through the air inlet hole 143 can flow smoothly inside the battery casing 11, so as to prevent suffocation and improve the user experience.

The fixing support 17 comprises a first cylindrical portion 171 and a second cylindrical portion 172 which is sleeved on the first cylindrical portion 171. Specifically, the first cylindrical portion 171 abuts against the body portion 162 of the elastic mounting base 16, one end of the battery is fixed inside the second cylindrical portion 172, which means that, an outer surface of the battery 12 abuts against an inner wall of the second cylindrical portion 172 to stable the battery 12. In the present embodiment, the notch 173 is defined on an outer surface of the first cylindrical portion 171 along an axial direction of the fixing support 17, quantity of the notch 173 is two, and the two notches 173 are defined symmetrically to the central axis of the fixing support 17 to ensure the airflow can flow smoothly inside the battery rod, the quantity of the notch 173 is not limited to two, and is not limited here.

Figure 9:
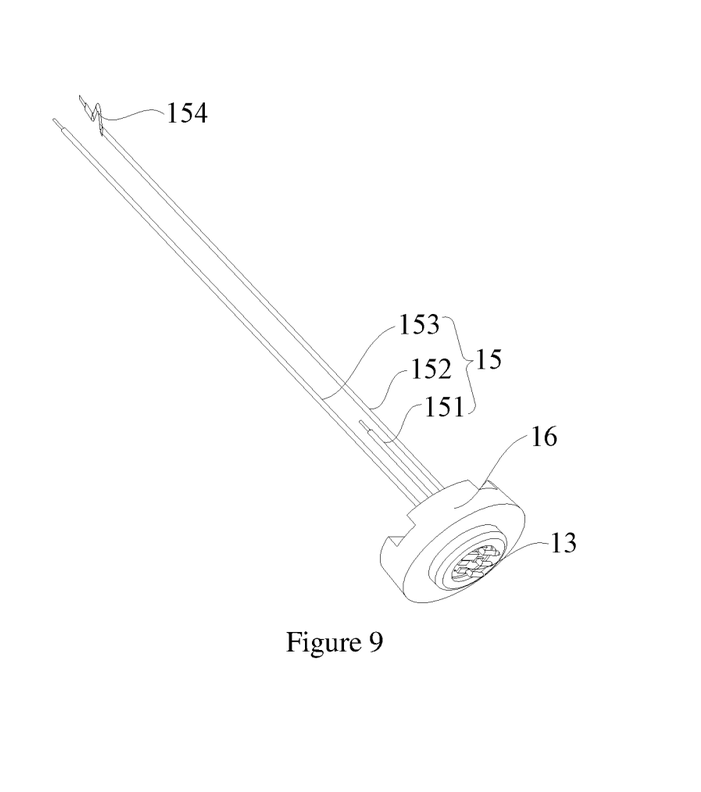
FIG. 9 is a structure diagram of a control module and an elastic mounting base after assembling provided by a preferred embodiment of the present application.

Refer to FIG. 9, the control module 13 comprises a control circuit and the airflow sensor for responding to a smoking action, wherein, the control module 13 is the prior art, and does not repeat here. The control module 13 is installed on the elastic mounting base 16, the inner peripheral surface of the elastic mounting base 16 elastically abuts against the outer peripheral surface of the control module 13 to fix the control module 13. The wires 15 are defined on the control module 13 which is utilized to form an electrical connection, the wires 5 thread through the through hole 161 and parts of the wires 15 are pressed between the control module 13 and the elastic mounting base 16, specifically, the control module 13 and the wires 15 are both fixed in the through hole 161 of the elastic mounting base 16 and elastically abut against the inner peripheral surface of the elastic mounting base 16. As the elastic behavior of the elastic mounting base 16, when the wires are clamped between the elastic mounting base 16 and he control module 13, a break or a fracture of the wires 15 is avoided; and as the wires and the control module 13 pass through the same through hole 161 on the elastic mounting base 16, compared to the prior art wherein wires pass through separate holes, the present invention has a simple assembly means, improves a working efficiency; on the other hand, as the wires and the control module 13 are fixed in the same through hole 161, airtightness between the control module 13 and the elastic mounting base 15 is ensured, and improves the sensitivity of an electronic cigarette.

The wires 15 comprise a first wire 151, a second wire 152 and a third wire 153, the first wire 151 is connected to one end of the battery 12 after threading from the through hole 161, the second wire 152 threads through the through hole 161 and is pressed between the battery 12 and the fixing support 17, then extends along one side which is close to the first electrode connecting piece 20 and is electrically connected to the first electrode connecting piece 20, the third wire 153 threads through the through hole 161 and is pressed between the battery 12 and the fixing support 17, then extends along one side which is close to the second electrode connecting piece 30 and is electrically connected to the second electrode connecting piece 30. One side of the second wire 152 which is close to the first electrode connecting piece 20 is provided with a bending portion 154, the bending portion 154 is electrically connected to the other end of the battery 12, it will be seen from this that the first wire 151 is electrically connected to one end of the batter 12, the bending portion 152 is connected to the other end of the battery 12, thus the control module 13 can control whether the battery 12 to supply power to the atomizing assembly or not, wherein, one end of the battery 12 is a positive electrode, then other end of the battery 12 is a negative electrode.

The battery rod in the present invention, by embedding the control module 13 inside the elastic mounting base 16, and defining the through hole 161 that penetrates the elastic mounting base 16 along its axial direction, and then fixing the control module 13 and the wires 15 into the through hole 161, it is possible for the inner peripheral surface of the elastic mounting base 16 to abut against the outer wall of the control module 13, the wires 15 are arranged and partly compressed between the control module 13 and the elastic mounting base 16, thus, the control module 13 and the wires 15 pass through the same through hole 161, compared to the prior art wherein wires 15 pass through separate holes, the present invention has a simple assembly means, saves time, and reduces a product defect rate, one through hole 161 is only needed to be defined on the elastic mounting base 16, it is easy for producing a mould of the elastic mounting base 16, and extending a service life; as an elastic behavior of the elastic mounting base 16, the phenomenon of short circuit and open circuit which are caused by a break or a fracture of the wires 15 can be avoided; the elastic mounting base 16 compresses both the control module 13 and the wires 15 to improve the tightness of the sealing between the control module 13 and the elastic mounting base 16 and seal two sides of the elastic mounting base 16, when users smoke lightly, a differential air pressure is formed at the two sides of the elastic mounting base 16, making a smoking signal is detected by the airflow sensor, thus to improve the sensitivity of the electronic cigarette.

The present invention further provides an electronic cigarette, comprising an atomizing assembly and a battery rod which are connected with each other, the atomizing assembly and the battery rod are detachable or non-detachable to form an integral. When he atomizing assembly and the battery rod are detachable, they can be connected through threaded connection, block connection, interface fit connection, one body forming, magnetic connection and other ways to connect. The battery rod of the electronic cigarette in the present invention is the battery rod which is described above, as the battery rod has the structure characteristics of the battery rod which is mentioned above, thus, the electronic cigarette which is comprised by the battery rod provides the same effects of the battery rod which is mentioned above. The atomizing assembly is the prior are which is not repeated here.

Above illustrated embodiments of the present invention with attached figures, which are only some preferable embodiments of the present invention, cannot be utilized to limit the claim scope of the present invention. The specific implementation of the above is only schematic, rather than restrictive. It should be understood that, in the inspiration of the present application, those skilled in the art who appreciate and realize all or part of the process in above embodiments may make many modifications or alternatives, without going beyond the purpose and the scope the claims intend to protect of the present application. All these belong to the protection of the present application.

What is claimed is:

1. A battery rod configured to be connected with an atomizing assembly to form an electronic cigarette, comprising:
   a battery casing (11);
   a battery (12) mounted inside the battery casing (11);
   a control module (13) configured to control the battery (12) to supply power to the atomizing assembly, and
   an end cover (14) that covers one end of the battery casing (11),
   wherein wires (15) which is used for an electrical connection and an airflow sensor which is used for sensing a smoking action are provided on the control module (13); and
   wherein an elastic mounting base (16) is defined in the battery casing (11), the elastic mounting base (16) is provided with a through hole (161) running along an axial direction of the elastic mounting base (16), the control module (13) is installed in the through hole (161) of the elastic mounting base (16), an inner peripheral surface of the elastic mounting base (16) elastically abuts against an outer peripheral surface of the control module (13), the wires (15) thread through the through hole (161) and parts of the wires (15) are pressed between the control module (13) and the elastic mounting base (16);
   wherein the end cover (14) comprises a cover body (141) which is defined outside the battery casing (11) and a connecting sleeve (142) which is interposed at the battery casing (11), the connecting sleeve (142) is embedded with a diffusion cover (18) which is utilized to enable light source to evenly disperse, one end of the diffusion cover (18) which is close to the elastic mounting base (16) is provided with at least one first groove (181) which is used to allow a communication of an airflow and communicate with the through hole (161); and wherein the diffusion cover (18) is a hollow cylinder and comprises a circular ring (182) which is embedded in the connecting sleeve (142) and a circular convex platform (183) that protrudes from one end surface of the circular ring (182) which is close to the elastic mounting base (16), the first groove (181) is a through groove which is defined on an axial direction of the circular convex platform (183).

2. The battery rod according to claim 1, wherein, along a periphery of the through hole (161), one end of the elastic mounting base (16) which is on an opposite side of the end cover (14) is convexly defined with an oil proof ring (165) which is utilized for prevent cigarette oil from entering into the through hole (161).

3. The battery rod according to claim 1, wherein, a wall of the through hole (161) outwardly recesses along a radial direction and forms a fixing slot (166) which is utilized to fix the control module (13), at least one end of the elastic mounting base (16) which is close to the fixing slot (166) is defined with a blocking portion (167) which is utilized for prevent the control module (13) from falling off.

4. The battery rod according to claim 1, wherein, the elastic mounting base (16) comprises a body portion (162) and an abutting portion (163) that diameter-decreasingly protrudes in an axial direction along one side of the body portion (162) which is close to the diffusion cover (18), one end surface of the body portion (162) is abutted and fixed with one end surface of the connecting sleeve (142), one end surface of the abutting portion (163) is abutted and fixed with one end surface of the circular convex platform (183), the through hole (161) axially penetrates a middle part of the abutting portion (163) and the body portion (162).

5. The battery rod according to claim 4, wherein, further comprises a fixing support (17) which is defined on one side of the elastic mounting base (16) which is opposite to the end cover (14) and is abutted against the elastic mounting base (16), one end of the battery (12) is fixed in the fixing support (17), the wires (15) comprise a first wire (151), a second wire (152) and a third wire (153), the first wire (151) is connected to one end of the battery (12) after threading from the through hole (161), the second wire (152) and the third wire (152) are compressed to fix between the battery (12) and the fixing support (17) after threading from the through hole (161).

6. The battery rod according to claim 5, wherein, a side wall of the cover body (141) defines an air inlet hole (143) which is communicated with inside of the battery casing (11); along an axial direction of the connecting sleeve (142), an outer surface of the connecting sleeve (142) is provided with an air inlet groove (144) which is communicated with the air inlet hole (143), one end of the air inlet groove (144) which is opposite to the air inlet hole (143) is communicated with a hollow inside of the connecting sleeve (142).

7. The battery rod according to claim 6, wherein, at least one second groove (164) is defined on one end surface of the body portion (162) which is close to the fixing support (17), at least one notch (173) is defined on an outer surface of the fixing support (17) along an axial direction of the fixing support (17), the air inlet hole (143), the air inlet groove (144), the first groove (181), the through hole (161), the second groove (164) and the notch (173) are communicated to form an air passage inside the battery casing (11) .

8. The battery rod according to claim 7, wherein, the fixing support (17) is a step cylinder, and comprises a first cylindrical portion (171) and a second cylindrical portion (172) which is sleeved in the first cylindrical portion (171), the notch (173) is defined on an outer surface of the first cylindrical portion (171), quantity of the notch (173) is two and two notches (173) are defined symmetrically to the central axis of the fixing support (17); one end of the battery (12) is fixed inside the second cylindrical portion (172).

9. The battery rod according to claim 5, wherein, further comprises a first electrode connecting piece (20) and a second electrode connecting piece (30) which are defined on one end of the battery casing (11) which is opposite to the end cover (14) and insulated from each other, the second wire (152) threads through the through hole (161) and is pressed between the battery (12) and the fixing support (17), then extends along one side which is close to the first electrode connecting piece (20) and is electrically connected to the first electrode connecting piece (20), the third wire (153) threads through the through hole (161) and is pressed between the battery (12) and the fixing support (17), then extends along one side which is close to the second electrode connecting piece (30) and is electrically connected to the second electrode connecting piece (30).

10. The battery rod according to claim 9, wherein, one side of the second wire (152) which is close to the first electrode connecting piece (20) is provided with a bending portion (154), the bending portion (154) is electrically connected to the other end of the battery (12).

11. The battery rod according to claim 1, wherein, the elastic mounting base (16) can be a silicone product, a polyurethane product, a polyvinyl chloride product or an ethylene vinyl acetate copolymer product.

12. The battery rod according to claim 1, wherein, the diffusion cover (18) is made of silica gel.

13. An electronic cigarette comprising an atomizing assembly and a battery rod, wherein the battery rod comprises a battery casing (11), a battery (12) mounted inside the battery casing (11), a control module (13) configured to control the battery (12) to supply power to the atomizing assembly, and an end cover (14) that covers one end of the battery casing (11), wherein wires (15) which is used for an electrical connection and an airflow sensor which is used for sensing a smoking action are provided on the control module (13), wherein, an elastic mounting base (16) is also provided within the battery casing (11), the elastic mounting base (16) is provided with a through hole (161) running along an axial direction of the elastic mounting base (16), the control module (13) is installed in the through hole (161) of the elastic mounting base (16), an inner peripheral surface of the elastic mounting base (16) elastically abuts against an outer peripheral surface of the control module (13), the wires (15) thread through the through hole (161) and parts of the wires (15) are pressed between the control module (13) and the elastic mounting base (16);

wherein, the end cover (14) comprises a cover body (141) which is defined outside the battery casing (11) and a connecting sleeve (142) which is interposed at the battery casing (11), the connecting sleeve (142) is embedded with a diffusion cover (18) which is utilized to enable light source to uniformly disperse, one end of the diffusion cover (18) which is close to the elastic mounting base (16) is provided with at least one first groove (181) which is used to allow a communication with an airflow and the through hole (161); and wherein the diffusion cover (18) is a hollow cylinder and comprises a circular ring (182) which is embedded in the connecting sleeve (142) and a circular convex platform (183) that protrudes from one end surface of the circular ring (182) which is close to the elastic mounting base (16), the first groove (181) is a through groove which is defined on an axial direction of the circular convex platform (183).

14. The electronic cigarette according to claim 13, wherein, along a periphery of the through hole (161), one end of the elastic mounting base (16) which is on an opposite side of the end cover (14) is convexly defined with an oil proof ring (165) which is utilized for prevent cigarette oil from entering into the through hole (161).

15. The electronic cigarette according to claim 13, wherein, a wall of the through hole (161) outwardly recesses along a radial direction and forms a fixing slot (166) which is utilized to fix the control module (13), at least one end of the elastic mounting base (16) which is close to the fixing slot (166) is defined with a blocking portion (167) which is utilized for prevent the control module (13) from falling off.

16. The electronic cigarette according to claim 13, wherein, the electronic cigarette further comprises a fixing support (17) which is defined on one side of the elastic mounting base (16) which is opposite to the end cover (14) and is abutted against the elastic mounting base (16), one end of the battery (12) is fixed in the fixing support (17), the wires (15) comprise a first wire (151), a second wire (152) and a third wire (153), the first wire (151) is connected to one end of the battery (12) after threading from the through hole (161), the second wire (152) and the third wire (152) are pressed to fix between the battery (12) and the fixing support (17) after threading from the through hole (161).

17. A battery rod configured to be connected with an atomizing assembly to form an electronic cigarette, comprising:
a battery casing (11);
a battery (12) mounted inside the battery casing (11);
a control module (13) configured to control the battery (12) to supply power to the atomizing assembly, and
an end cover (14) that covers one end of the battery casing (11),
wherein wires (15) which is used for an electrical connection and an airflow sensor which is used for sensing a smoking action are provided on the control module (13); and wherein an elastic mounting base (16) is defined in the battery casing (11), the elastic mounting base (16) is provided with a through hole (161) running along an axial direction of the elastic mounting base (16), the control module (13) is installed in the through hole (161) of the elastic mounting base (16), an inner peripheral surface of the elastic mounting base (16) elastically abuts against an outer peripheral surface of the control module (13), the wires (15) thread through the through hole (161) and parts of the wires (15) are pressed between the control module (13) and the elastic mounting base (16); and wherein the elastic mounting base (16) is provided with the through hole (161) running along the axial direction, the control module (13) and the wires (15) are both installed in the through hole (161) and elastically abuts against an inner peripheral surface of the elastic mounting base (16), the wires (15) comprise a first wire (151), a second wire (152) and a third wire (153), the first wire (151) is connected to one end of the battery (12) after threading from the through hole (161); the end cover (14) comprises a cover body (141) which is defined outside the battery casing (11) and a connecting sleeve (142) which is interposed at the battery casing (11), the connecting sleeve (142) is embedded with a diffusion cover (18) which is utilized to enable a light source to uniformly disperse; the diffusion cover (18) comprises a circular ring (182) and a circular convex platform (183) that protrudes from one end surface of the circle ring (182) which is close to the elastic mounting base (16), the elastic mounting base (16) comprises a body portion (162) and an abutting portion (163) that diameter-decreasingly protrudes along one side of the body portion (162) which is close to the diffusion cover (18), one end surface of the body portion (162) is abutted and fixed with one end surface of the connecting sleeve (142), one end surface of the abutting portion (163) is abutted and fixed with one end surface of the circular convex platform (183); the battery rod further comprises a fixing support (17) which is defined on one side of the elastic mounting base (16) which is opposite to the end cover (14) and is abutted against the elastic mounting base (16), one end of the battery (12) is fixed in the fixing support (17), the second wire (152) and the third wire (152) are compressed between the battery (12) and the fixing support (17) after threading from the through hole (161).

* * * * *